United States Patent [19]

Inoue et al.

[11] 4,287,579
[45] Sep. 1, 1981

[54] MOVING OBJECT DETECTING DEVICE

[75] Inventors: Hiromitsu Inoue, Kyoto; Hiroshi Ohashi, Hirakata; Mikio Kondō, Tsu, all of Japan

[73] Assignee: Matsushita Electric Works, Ltd., Osaka, Japan

[21] Appl. No.: 92,487

[22] Filed: Nov. 8, 1979

[30] Foreign Application Priority Data

Aug. 11, 1978 [JP] Japan ........................... 53-137454

[51] Int. Cl.³ .................................................. G01S 15/04
[52] U.S. Cl. ................................... 367/94; 340/554; 343/5 PD
[58] Field of Search .................... 343/5 PD; 367/94; 340/554

[56] References Cited

U.S. PATENT DOCUMENTS

| | | | |
|---|---|---|---|
| 3,394,342 | 7/1968 | Walker | 343/5 PD X |
| 3,665,443 | 5/1972 | Galvin | 343/5 PD X |
| 3,733,581 | 5/1973 | Kalmus | 367/94 |
| 3,778,823 | 12/1973 | Sato et al. | 343/5 PD X |
| 3,938,118 | 2/1976 | Galvin et al. | 367/94 X |
| 3,942,178 | 3/1976 | Hackett | 343/5 PD |
| 3,987,427 | 10/1976 | Clift | 367/94 |
| 4,114,146 | 9/1978 | Inoue et al. | 343/5 PD X |

*Primary Examiner*—Malcolm F. Hubler
*Attorney, Agent, or Firm*—Burns, Doane, Swecker & Mathis

[57] ABSTRACT

A moving object detecting device employing a pair of Doppler signals as a pair of vector signals of respective received-wave signals representing momentary reflected waves from a moving object. These vector signals are processed to obtain signals denoting in which ones of predetermined zones for the vector rotation depending on the movements of the object the vector is momentarily present, and shifting states of such zone signals through the zones are traced to sequentially determine the direction and period of the vector rotation and to actuate an alarm or the like when the rotation is in a fixed direction.

6 Claims, 12 Drawing Figures

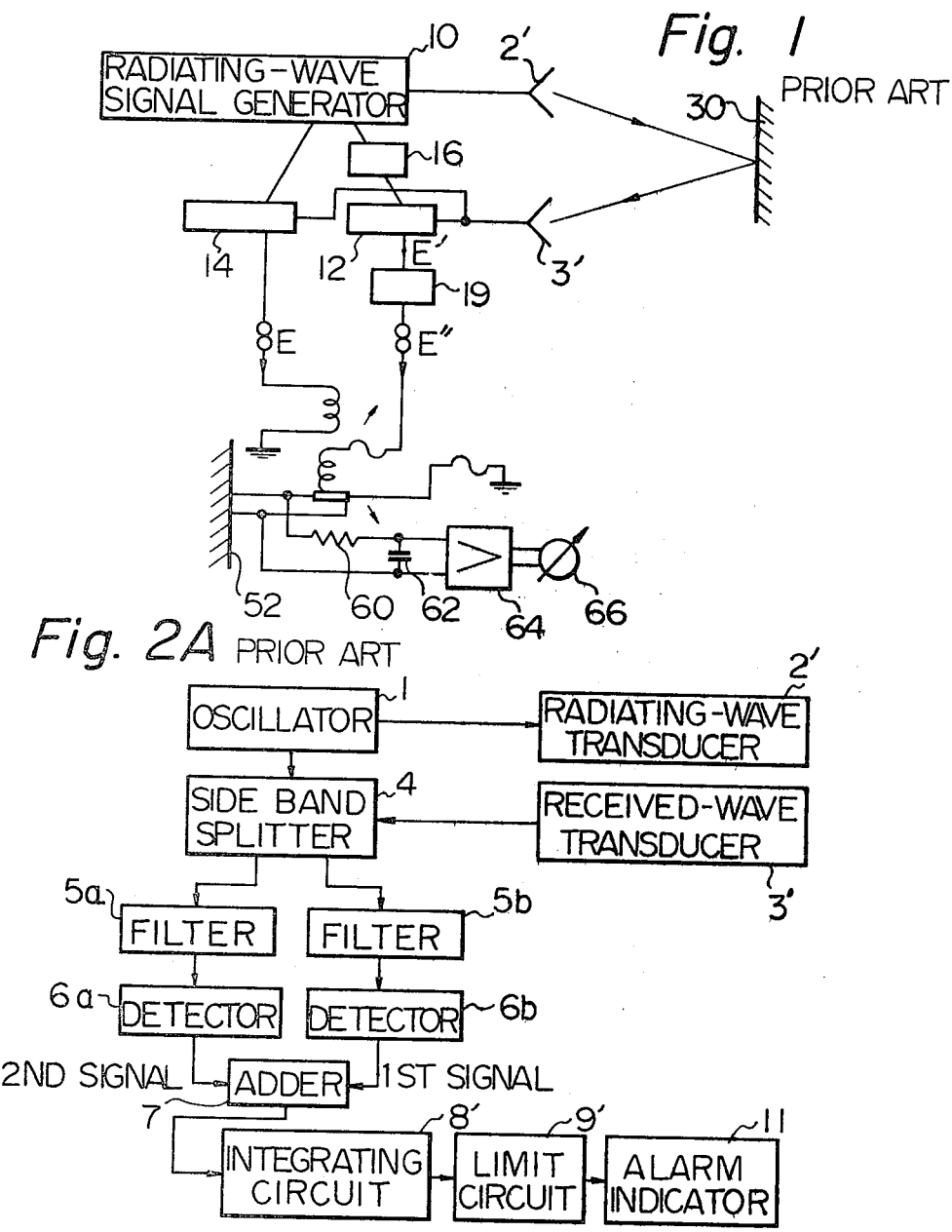

MOVING OBJECT DETECTING DEVICE

This invention relates to moving object detecting devices and, more particularly, to improvements in Doppler type detecting devices specifically of an object which continuously moving.

It has been known, as suggested in U.S. Pat. No. 2,934,756 of Apr. 26, 1960 to H. P. Kalmus, to detect a presence of a moving object by radiating continuous energy waves by a wave radiator into a watching space, receiving the waves reflected from the object present within the range of the watching space by a wave receiver, detecting by means of a detector a beat produced in output signals of the wave receiver due to variations in the distance between the object and the wave radiator, that is, due to the Doppler effect depending on movements of the object, and having any detected output of the detector indicated when such output is above a predetermined level. According to this U.S. patent, however, it is possible that an erroneous indication of reduction of S/N ratio is caused by a clutter noise due to any fluctuations in conditions existing in the course of the propagation of the energy waves or directionally varying movements of the object within the watching space.

There has been suggested in another U.S. Pat. No. 3,432,855 of Mar. 11, 1969 to H. P. Kalmus a different type of moving target indicator of such arrangement as shown in FIG. 1 of accompanying drawings, wherein any interference of the clutter noise is prevented, utilizing a phenomenon that the object continuously moving in one direction produces a Doppler signal either above or below the frequency of radiated wave signal and, on the other hand, the frequency of the clutter noise is distributed both above and below the frequency of the radiated wve signal. According to this patent, a generated signal of a radiating wave signal generator 10 is radiated through a wave radiator 2′, reflected waves are received by a wave receiver 3′, a received wave signal is applied to mixers 12 and 14, first Doppler signal E and second Doppler signal E′ the phase of which is delayed by means of a phase shifter 16 by 90° from the first Doppler signal E are respectively extracted, and a third Doppler signal E″ of a phase delayed by a phase shifter 19 by 90° from the second Doppler signal E′ is obtained. When a moving object 30 approaches the wave radiator 2′, the frequency of the Doppler signal is higher than the radiating wave frequency radiated by the wave radiator 2′, so that the first and third Doppler signals E and E″ will be of the same phase with each other and a correlator 52 will produce a positive voltage signal. On the contrary, when the moving object 30 moves away from the wave radiator 2′, the frequency of the Doppler signal is lower than the radiating wave frequency, the Doppler signals E and E″ will be reverse to each other in the phase and the correlator 52 will produce a negative voltage signal. Thus, when the moving object is present, either one of such positive and negative signals is present, and the signal will be integrated by an integrator which comprises a resistance 60 and capacitor 62, an output of the integrator will be amplified by an amplifier 64 and then an indicator 64 will operate. The particular integrator has a function of suppressing the clutter noise when the same is present. While reasons for this suppressing effect are not specified in the U.S. Pat. No. 3,422,855, it is evident that the suppressing effect is that, so long as the frequency of the clutter noise is distributed above and below the radiating wave frequency, the correlator 52 will generate positive and negative voltage signals at random and such positive and negative signals will produce no output of the integrator. It is appreciable that the U.S. Pat. No. 3,422,855 realizes a moving object detecting device having a direction sensing ability and suggests a technical idea of thereby suppressing any influence of the clutter noise. According to this device, however, it is difficult to realize the phase shifter 19. That is, in the case of such moving object as a human whose moving speed is variable from a low speed to a high speed, the frequency of the generated Doppler signal has a width of about an octave and, in order to shift the phase of such Doppler signal including all of this frequency exactly by 90°, the phase shifter 19 is required to be of a very wide band, thus the shifter becomes high in the cost, the first and third Doppler signals E and E″ will often not be of the same or reverse phases, and the detecting sensitivity will greatly reduce.

On the other hand, U.S. Pat. No. 3,665,443 of May 23, 1972 to A. A. Galvin suggests to utilize a phenomenon that the spectrum of a moving object is asymmetrical with the frequency of radiated wave signal but the spectrum of a noise is symmetrical with the radiated wave signal frequency, and a device utilizing these spectrum characteristics different from each other is shown in the patent. This device is featured, as compared with the above described U.S. Pat. No. 3,432,855, in that both first and second signals can be provided in the presence of an interference phenomenon, and is progressive in respect of a difference in the noise detecting technique. The U.S. Pat. No. 3,665,443 is of such a system as shown in FIG. 2A, wherein a signal oscillated by an oscillator 1 is radiated as ultrasonic waves in air by a radiating ultrasonic wave transducer 2′, reflected waves are received by a received ultrasonic wave transducer 3′, its received signal is extracted as split by a side band splitter 4 into upper side band waves of a frequency larger than that of radiated wave signal and lower side band waves of a frequency smaller than that of the radiated wave signal and of a reverse polarity to the upper side band waves, both side band waves are provided into an adder 7 to be added therein through filter 5a and wave detector 6a or 5b and 6b, added result is integrated by an integrating circuit 8′, the time when the energy of either one of these side band waves is larger than that of the other is detected by a limit circuit 9′ in respect of an integrated output of the integrating circuit 8′, an alarm is indicated by an alarm indicator 11 and, in case both of the side band waves are balanced, no alarm is indicated.

In this U.S. Pat. No. 3,665,443, on the other hand, there are still involved such possibilities that, first, an erroneous alarm may be made due to an actually present unbalanced noise such as, for example, such ultrasonic wave noise radiated from a bunch of keys carried by a moving person as shown in FIG. 2B wherein a curve X shows the spectrum of such balanced noise as a bell ring and a curve Y shows the unbalanced noise, and, second, no alarm may be indicated in the case of a so-called kick-back phenomenon. Thus, it is not ignorable that there exists a phenomenon in which a moving object is present but its presence cannot be detected. More specifically, as shown in FIG. 2C, when such moving object 30 as a person is present and moves at a position close to a wall surface lying substantially at right angles with respect to main advancing direction of the radiated ultrasonic waves, a frequency fd of Doppler signal reflected directly from the moving object and a frequency fd' of Doppler signal reflected indirectly from the moving object 30 through the wall surface will be present respectively above and below the frequency $f_o$ of the radiated wave signal and both of these direct and indirect Doppler signals will be simultaneously generated and extracted so that the presence of the object practically cannot be detected. This is an exemplary event where the provision of either the first and second signal depending on the spectrum characteristics at the presence of the object as the U.S. Pat. No. 3,665,443 discloses is practically impossible. Further according to this patent, both of the first and second signals are concurrently provided in the presence of a noise, that is, the interference phenomenon so that, in an event when the moving object is present under such conditions as above, both of the first and second Doppler signals will be generated and the moving object will not be able to be detected. The phenomena ocurring in the above three examples are all effective in rendering any known detecting devices for intruding object to be defective. The present invention has been suggested to eliminate such defects of conventional devices.

A principal object of the present invention is, therefore, to provide a highly reliable moving object detecting device of Doppler type, which is free from any erroneous alarming operation with respect to the noise, interference phenomenon and the like.

Another object of the present invention is to provide a device of the kind referred to, which is still simple in the structure and inexpensive.

A related object of the present invention is to provide a moving object detecting device which requires no such frequency analysis based on spectrum characteristics of the received wave signals that causes the device to involve possibilities of the erroneous operation.

Other objects and advantages of the present invention will be made clear upon reading the following descriptions of the invention detailed with reference to a preferred embodiment thereof shown in accompanying drawings, in which:

FIG. 1 is a block diagram showing an example of conventional circuit arrangements of the moving object detecting device;

FIG. 2A is a block diagram of another example of the conventional arrangements;

Figure 3:
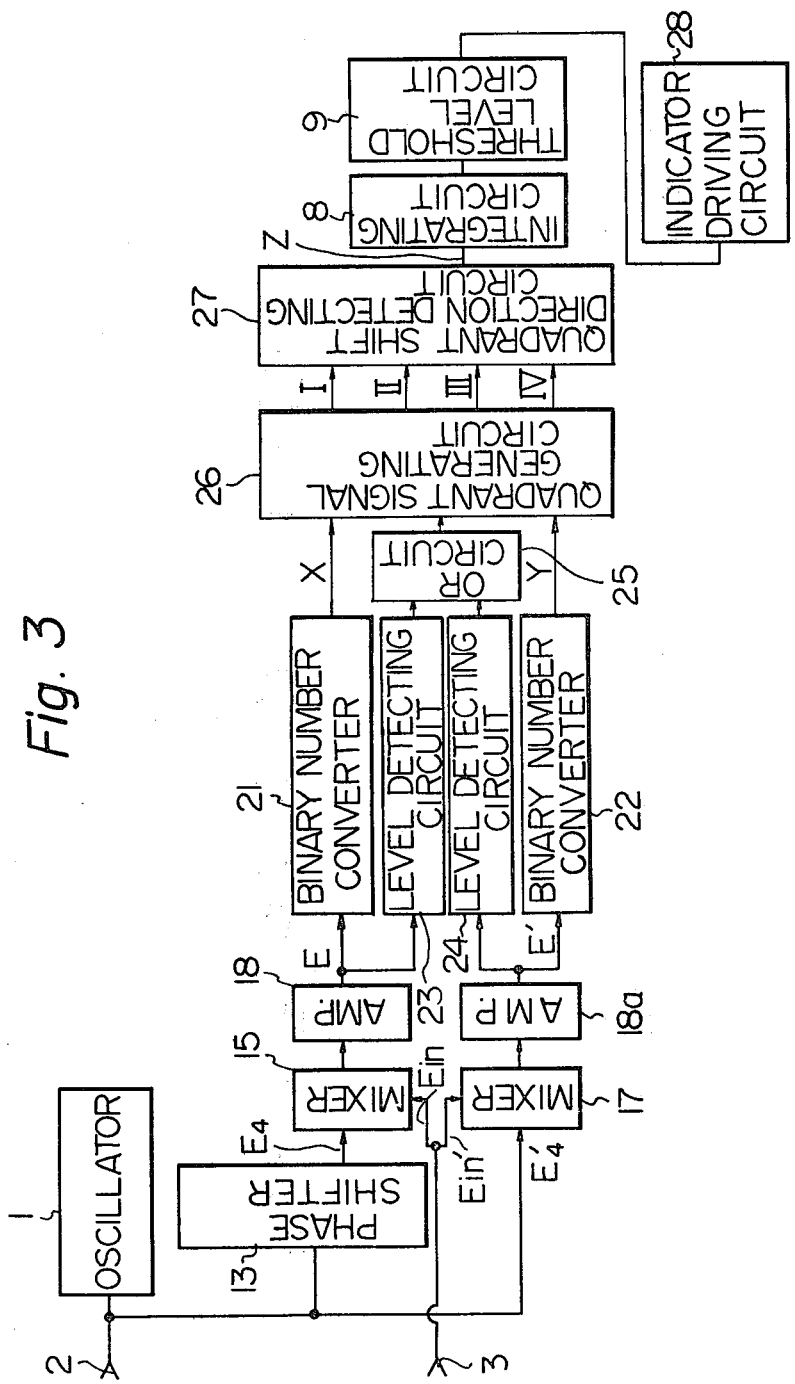
FIG. 3 is a block circuit diagram of a preferred embodiment according to the present invention.

Referring now to FIG. 3 showing an embodiment of the moving object detecting device according to the present invention, an oscillator 1 has an oscillating frequency corresponding to the frequency of, for example, ultrasonic waves and its output signal of such frequency is fed as a radiating-wave signal $E_4'$ to a radiating-wave transducer 2 comprising, for example, a pair of electrodes fitted to opposite surfaces of a piezoelectric crystal element so that, in this case, ultrasonic waves will be radiated from the transducer 2 into a space of watching zone. A received-wave transducer 3 of a similar structure to the radiating-wave transducer 2 is installed within the watching zone together with the transducer 2, so as to receive any reflected ultrasonic waves back from an object present in the space and to convert the received reflected-waves into an electric received-wave signal $E_{in}$. A phase shifter 13 receives the radiating-wave signal $E_4'$ directly from the oscillator 1 and shifts the phase of the radiating-wave signal $E_4'$ to produce a signal $E_4$. Mixers 15 and 17 are connected respectively to the phase shifter 13 and oscillator 1 so that the mixer 15 will receive the received-wave signal as $E_{in}$ and mix it with the phase-shifted signal $E_4$ and the mixer 17 will receive the received-wave signal as $E_{in}'$ and mix it with the radiating-wave signal $E_4'$, and these mixed and detected signals of $E_4$, $E_{in}$ and $E_4'$, $E_{in}'$ are respectively amplified by amplifiers 18 and 18a and a pair of Doppler signals E and E' are provided. Binary number converters 21 and 22 connected to the amplifiers 18 and 18a convert the respective Doppler signals E and E' to a pair of binary numbers X and Y of digital signals, which store respectively a quadrant information that denotes, when the received-wave signal is vector-indicated with the radiating-wave signal $E_4$ or $E_4'$ used as a reference vector, a specific quadrant in which a received-wave signal vector $E_{in}$ will be present. Level detecting circuits 23 and 24 are also connected to the amplifiers 18 and 18a to detect whether the vector $E_{in}$ is present or not depending on whether signal level of the vector signal is above a predetermined level or not. Resultant outputs of these level detecting circuits 23 and 24 are provided into an OR circuit 25, which generates, upon receiving the output from either one of the level detecting circuits 23 and 24, a signal denoting the presence of the vector $E_{in}$. A quadrant signal generating circuit 26 is connected to the converters 21 and 22 and to the OR circuit 25 for generating a quadrant signal I, II, III or IV corresponding at 1:1 to the specific quadrant in which the vector $E_{in}$ is present on base of a given combination of the binary number digital signals X and Y. A quadrant shift direction detecting circuit 27 receives such quadrant signals I through IV and generates a single signal Z of either positive or negative voltage in response to sequences of the received quadrant signals, that is, in response to from which quadrant the quadrant signal at a specific moment has been shifted, so as to discriminatively indicate a direction in which the vector is being shifted, and the circuit 27 maintains this positive or negative signal Z until the quadrant signal is shifted to another quadrant or vanishes. An integrating circuit 8 receives and integrates the output of the quadrant shift direction detecting circuit 27 and its integrated output is detected by a threshold level circuit 9 having a predetermined limit level. The threshold level circuit 9 drives an indicator driving circuit 28 with its detected signal and indicates the presence of a moving object.

While, in the above, the use of the ultrasonic waves has been elucidated as an example, the waves radiated need not be limited to the ultrasonic waves but may be any microwaves.

Figure 4:
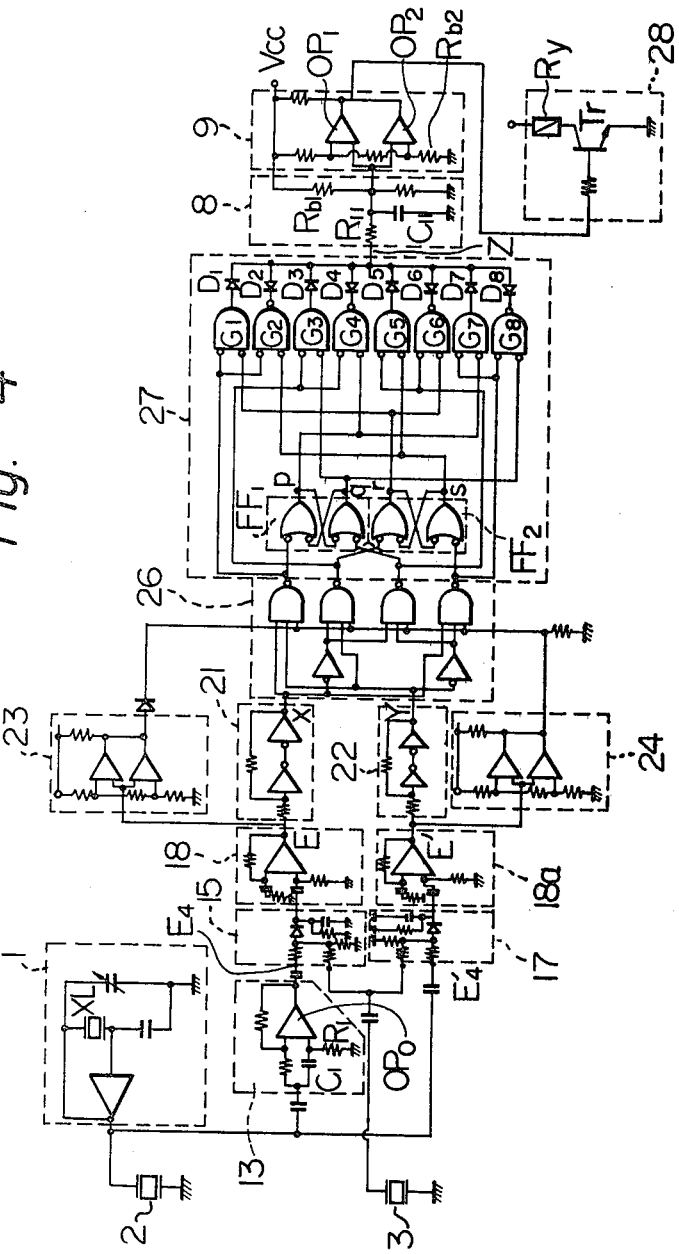
FIG. 4 shows a practical circuit arrangement of the embodiment shown in FIG. 3.

Referring to the present invention more specifically by reference in the followings to a practical example of circuit arrangement of the device as shown in FIG. 4, the radiating-wave signal $E_4'$ is generated by the oscillator 1 which employs a crystal oscillating element XL. The phase shifter 13 comprises a capacitor $C_1$, resistance $R_1$ and operational amplifier $OP_o$. References shall be made briefly here to the pair of Doppler signals provided from the respective amplifiers 18 and 18a by reference to FIG. 5 while these signals have been already detailed, for example, in the U.S. Pat. No. 3,432,855. When a vector indication is made as in respective rectangular coordinates of FIG. 5 with the input signal from the oscillator 1 to the mixer 17 denoted as $E_4'$ and the Doppler component of the received-wave signal denoted as $E_{in}$ while denoting the input signal from the phase shifter 13 to the mixer 15 as $E_4$, the following relations will exist between the Doppler signals E and E' and the received wave vector $E_{in}$ if the phase angle of the received-wave Doppler component $E_{in}$ with respect to the vector $E_4$ made as the reference vector is $\theta$ as shown:

$$E = |E_{in}| \cos \theta$$

(as in vertical wave-form diagram of FIG. 5) and $$E' = |E_{in}| \sin \theta$$

Figure 5:
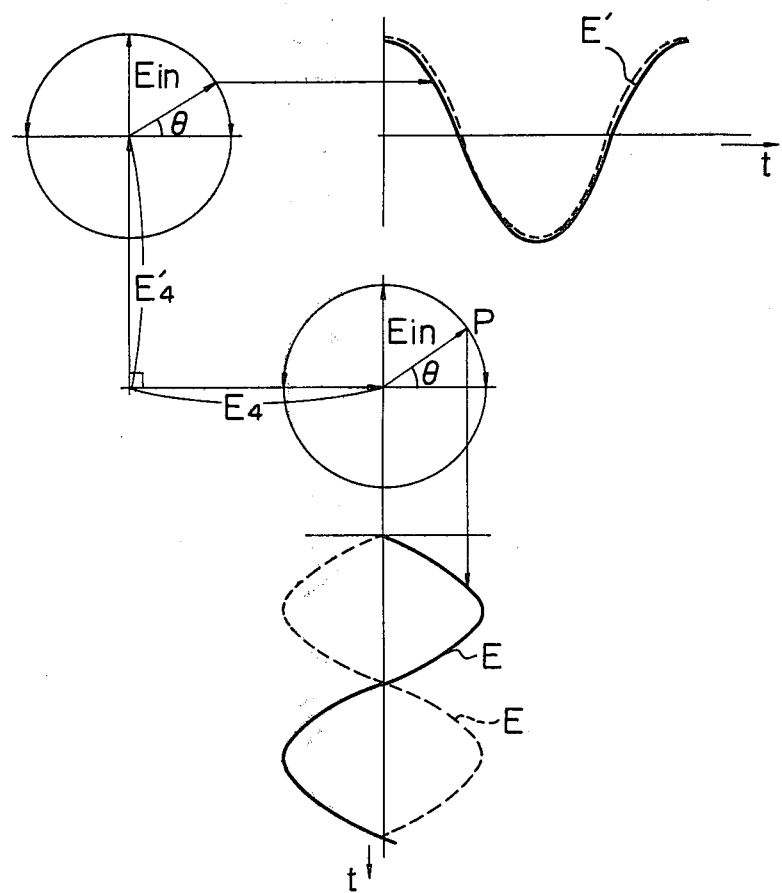
FIG. 5 is a diagram for explaining Doppler signals in general in relation to the vector and phase angle.

(as in horizontal wave-form diagram of FIG. 5).

Figure 6A:
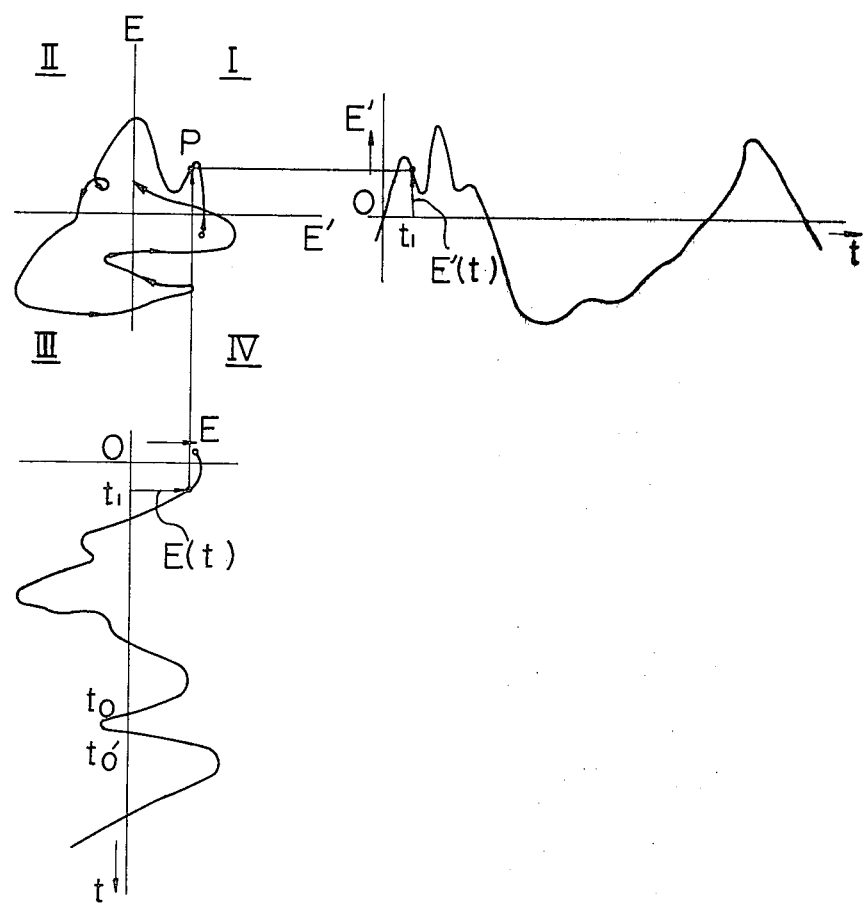
FIG. 6A is a diagram similar to FIG. 5 but for explaining the Doppler signals in the case of a moving object.

In the U.S. Pat. No. 3,432,855, it is considered important that this phase relation between the respective Doppler signals E and E' is different between the case where a single upper side band wave is present and the case where a single lower side band wave is present. That is, the Doppler signal E will advance in phase by 90° (as shown by the broken line) for an object approaching with respect to the Doppler signal E' but will delay in phase by 90° (as shown by the solid line) for an object moving away. However, when such moving object as, for example, a human walking or running, the respective portions of human body will have different speeds so that the received-wave vector $E_{in}$ will be a resultant vector having all of such advancing and delaying signal informations as shown in rectangular coordinates with indications of quadrants I through IV of FIG. 6A and, generally, the wave form of the Doppler signals E and E' will not be of such single sinusoidal wave signal as in FIG. 5 but will be such deformed wave forms as shown in FIG. 6A.

However, even if the received-wave vector $E_{in}$ is of a result of a combination of various components, the Doppler signals E and E' will show the relation of the above formulae; that is, a single point P on the rectangular coordinates of FIG. 5 having the tip of the reference vector $E_4$ as an origin. In other words, the rotary vector of the received-wave vector $E_{in}$ may be of values $E(t_1)$ and $E'(t_1)$ at a time $t_1$ which are ploted onto the E—E' rectangular coordinates from the respective E and E' wave form diagrams in FIG. 6A. Thus, the vector of the received-wave signal $E_{in}$ can be correctly reproduced even if the Doppler signals E and E' are combined and the received-wave vector $E_{in}$ contains various frequency components. On the other hand, the thus obtained Doppler signals E and E' contain so many frequencies in most cases that the U.S. Pat. No. 3,432,855 employing the 90° phase shift of the entire signal cannot be suitably adopted. Further, a method wherein respective energy levels of the upper and lower side band waves forming the received-wave signal as spectrally separated are strictly extracted or, in other words, the vector shown in FIG. 6A is analyzed and respective component vectors having different angular velocities are separated from one another, requires a complicated circuit and involves at the same time such defects as has been already described. Yet, with a method of judging whether the phase relation of the Doppler signals E and E' is merely an advance or delay of 90°, such deformed wave forms as in FIG. 6A will never be analyzed.

According to the present invention, therefore, the quadrant in which the vector $E_{in}$ is present and its shifting direction are perceived to be utilizable. In FIG. 6A, the apex E of the vector transfers from I→II→III→(IV→III→) IV→I as shown in the rectangular coordinates of FIG. 6A. It is evident that, except the parenthesized process (IV→III→), all the process shifts counterclockwise. At this time, many minor variations are present within a single quadrant but they cause no influence on the quadrant signals, and this clearly shows that the vector itself rotates counterclockwise as a whole. The present invention is, therefore, to detect the vector rotation from the standpoint of the shifting in the quadrants and to detect the moving object responsive to a signal denoting such quadrant shifting.

Now, the Doppler signals E and E' obtained by the mixers 15 and 17 and amplifiers 18 and 18a are converted to the digital signals X and Y by the binary number converters 21 and 22. In these signals X and Y, any level informations in the Doppler signals E and E' are erased but only the informations as to whether the vector apex is present above or below or on the right or left of the rectangular coordinates E—E'. Further, these signals X and Y are combined with each other, and four quadrant signals I, II, III and IV corresponding to such combination are generated as in the following Table 1 by the quadrant signal generating circuit 26:

TABLE 1

| X | Y | I | II | III | IV | Remarks |
|---|---|---|----|-----|----|---------|
| 1 | 1 | 0 | 1 | 1 | 1 | At the time when |
| 0 | 1 | 1 | 0 | 1 | 1 | the vector is above |
| 0 | 0 | 1 | 1 | 0 | 1 | a predetermined |
| 1 | 0 | 1 | 1 | 1 | 0 | level. |
| 1 or 0 | 1 or 0 | 1 | 1 | 1 | 1 | When the vector is below the level. |

The above can be readily obtained by forming the circuit 26 with a socalled decoder. For the convenience of the circuit, the signal 0 shows a quadrant signal and the signal 1 shows that there is no signal in the same quadrant. When the vector is, however, below a predetermined level, irrespective of the values of the signals X and Y, the vector is caused to be returned to the origin and the definition of the "quadrant signal" is not satisfied. Therefore, respective amplitudes of the Doppler signals E and E' are detected by the level detecting circuits 23 and 24. When either one of the Doppler signals is above the predetermined level, the OR circuit 25 here incorporated in the circuit 26 will generate an output and will provide the quadrant signal I, II, III or IV. In practice, the level checking may be made with respect to only either one of the Doppler signals E and E' or, strictly, $\sqrt{|E|^2+|E'|^2}$ or its function may be investigated considering that the distance from the origin is within a fixed range.

Thus, the quadrant signals I, II, III and IV in which the apexes of the vector obtained from the Doppler signals are present are obtained from the combination of the binary signals X and Y. Then, these quadrant signals are applied to the quadrant shift direction detecting circuit 27 for investigating the shifting directions of these quadrant signals. The quadrant shift direction detecting circuit 27 is to temporarily store the momentarily shifting quadrant signal and to determine in which direction of the four quadrants the vector shifts by investigating the stored signal when the vector has shifted to a new quadrant and a new quadrant signal is provided. Thus, the circuit 27 comprises two R-S flip-flops $FF_1$ and $FF_2$ of the storing circuit section, 8 gates $G_1$ to $G_8$ and 8 diodes $D_1$ to $D_8$ for preventing reverse current flow.

Figure 6B:
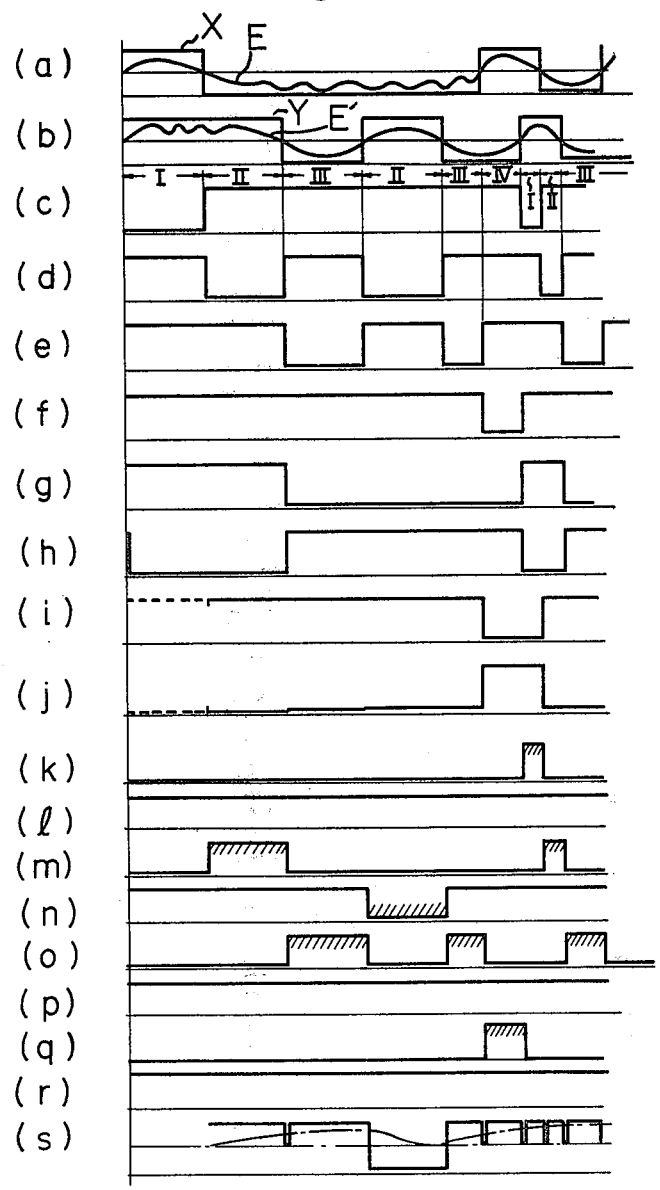
FIG. 6B shows wave forms at respective parts in the device of FIG. 4 in its operation with respect to the moving object.

The operation as above of the present invention shall be explained with reference to the case that the signals E and E' as in FIG. 6B are obtained. Wave forms of the signals X and Y obtained by respectively binarily converting the Doppler signals E and E' are shown in (a) and (b) of FIG. 6B on the same axis as of the Doppler signals E and E'. Now, when the binary signals X and Y are 1 and 1, the signal of the quadrant I is provided by the quadrant signal generating circuit 26 as in (c) of FIG. 6B. In the same manner, when the binary signals X and Y are 0 and 1, 0 and 0 and 1 and 0, the signals of the quadrants II, III and IV are respectively provided by the quadrant signal generating circuit 26 as in (d), (e) and (f) of FIG. 6B. The flip-flop $FF_1$ will be reversed by the quadrant signals I and III and outputs p and q (FIG. 4) of such wave forms as in (g) and (h) in FIG. 6B. As will be clear from the circuit of FIG. 4, during a period from the generation of the quadrant signal I to the generation of the quadrant signal III, p=1 and q=0, and, with the quadrant signals II and IV, the flip-flop $FF_1$ will not operate. On the contrary, after the generation of the quadrant signal III until the generation of the quadrant signal I, p=0 and q=1. In the same manner, the flip-flop $FF_2$ will be operated by the quadrant signals II and IV. During the period after the generation of the quadrant signal II until the generation of the quadrant signal IV, the outputs r and s (FIG. 4) shown in (i) and (j) of FIG. 6B will be r=1 and s=0. On the contrary, after the generation of the quadrant signal IV until the generation of the quadrant signal II, r=0 and s=1 and, with the quadrant signals I and III, the flip-flop $FF_2$ will not operate. The above operations are tabulated as in the following Table 2:

TABLE 2

| X | Y | Quadrant Signal | $FF_1$ Outputs p & q | $FF_2$ Outputs r & s |
|---|---|---|---|---|
| 1 | 1 | I | 1, 0 | no variation |
| 0 | 1 | II | no variation | 1, 0 |
| 0 | 0 | III | 0, 1 | no variation |
| 1 | 0 | IV | no variation | 0, 1 |

Then, the thus obtained signals p, q, r and s and the respective quadrant signals I, II, III and IV are respectively combined to take AND. That is, the quadrant signal I forms an AND with the signal r at the gate $G_1$ and an AND with the signal s at the gate $G_2$. The respective gates $G_1$ and $G_2$ are arranged so as to generate outputs under an input condition of both 0 and 0, whereby the gate $G_1$ generates an output of a positive voltage as in (k) of FIG. 6B, while the gate $G_2$ generates an output of a negative voltage as in (1) of FIG. 6B. Thus, when the quadrant signal I shows the shift from the quadrant IV, the outputs r and s of the flip-flop $FF_2$ will be r=0 and s=1, and an output will be generated at the gate $G_1$. When the shift from the quadrant II is shown, the outputs r and s of the flip-flop $FF_2$ will be r=1 and s=1 and a negative output will be generated at the gate $G_2$. That is, when the vector signal shifts counterclockwise, a signal of a positive voltage will be obtained and, when it shifts clockwise, a signal of a negative voltage wil be obtained. For the quadrant signal II, the gates $G_3$ and $G_4$ will operate, for the quadrant signal III, the gates $G_5$ and $G_6$ will operate and, for the quadrant signal IV, the gates $G_7$ and $G_8$ will operate so that, by the same operations as described above, the respective outputs will be obtained. Wave forms (m), (n), (o), (p), (q) and (r) of FIG. 6B show respectively the outputs of the gates $G_3$, $G_4$, $G_5$, $G_6$, $G_7$ and $G_8$.

Figure 2B:
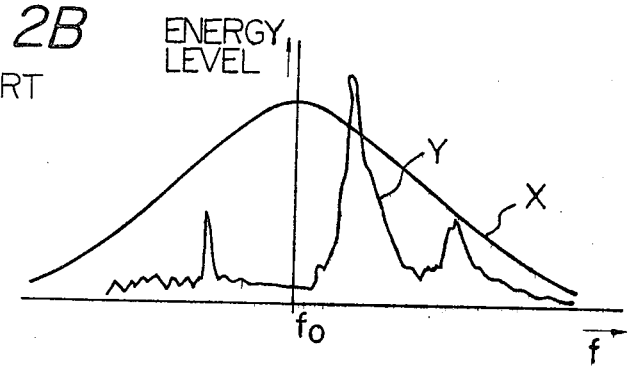
FIGS. 2B and 2C are explanatory diagrams for operations of the arrangement of FIG. 2A.
Figure 2C:
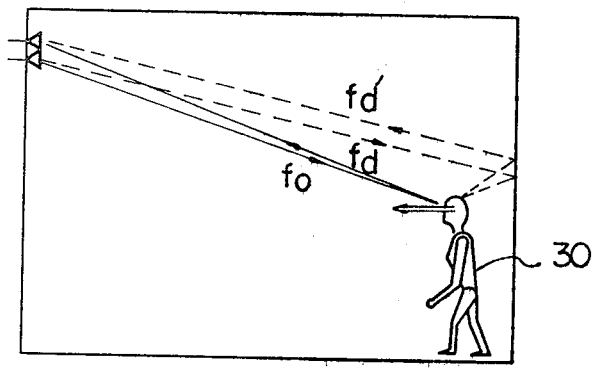
Figure 7:
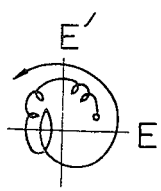
FIG. 7 is a diagram for explaining conditions of the Doppler signals in operation of the device of FIG. 4.

Thus, for a vector shiftings through the quadrants I→II→III→II→III→IV→I→II→III—, the outputs of the gates $G_1$ to $G_8$ are not known as a preceding state of the first quadrant signal I is not known, but the flip-flop $FF_1$ will store p=1 and q=0 and, when the next quadrant signal II is generated, an output of a positive voltage will be generated at the $G_3$ and the outputs r and s of the flip-flop $FF_2$ will be r=1 and s=0. When the next quadrant signal III is generated, an output of a positive voltage will be generated at the gate $G_5$ and the outputs of the flip-flop $FF_1$ will be p=0 and q=1. When the further quadrant signal II is generated, an output of a negative voltage will be generated at the gate $G_4$ and the outputs r and s of the flip-flop $FF_2$ will not vary. When the further quadrant signal III is generated, an output of a positive voltage will be generated at the gate $G_5$ and the outputs of the flip-flop $FF_1$ will be p=0 and q=1 and will not vary. Then, with the respective quadrant signals IV, I, II and III, outputs of positive voltage will be generated sequentially at the gates $G_7$, $G_1$, $G_3$ and $G_5$, the outputs p, q, r and s of the respective flip-flop $FF_1$ and $FF_2$ will be as shown in the drawing and an input signal Z to the integrating circuit 8 will be as shown by (s) of FIG. 6B. This vector signal is rotating as shown in FIG. 7 as led from the Doppler signals E and E'. In view of this fact, too, it is seen that the shifting direction of the vector is correctly detected. In the above arrangement, the diodes $D_1$ to $D_8$ are inserted to prevent any reverse current flow as disposed respectively in such directions as shown in the drawing to prevent any disorder. The above explained AND circuit of the gates $G_1$ and $G_8$ and logical circuit by the diodes $D_1$ to $D_8$ may be replaced by any other means having the same function.

The present invention is, therefore, summarizing the above descriptions, to determine the shifting direction in the quadrants of the vector by taking out any appointed one of the outputs p, q, r and s of the flip-flops $FF_1$ and $FF_2$ triggered by the respective quadrant signals I, II, III and IV, by means of the same quadrant signal that triggers the particular output. Now, the outputs p and q of the flip-flop $FF_1$ and the outputs r and s of the flip-flop $FF_2$ are respectively made significant so as to be as follows. The output signal p represents that the vector shifts either from the quadrant I or III to the quadrant II, thus p=1 means the shift I to II and p=0 means the shift III to II; similarly, the output q represents the shift from the quadrant III or I to the qaudrant IV, thus, q=1 means the shift III to IV and q=0 means the shift I to IV; the output r represents the shift from the quadrant II or IV to the quadrant III, thus, r=1 means the shift II to III and r=0 means the shift IV to III; and the output s represents the shift from the quadrant IV or II to the quadrant I, thus, s=1 means the shift IV to I and s=0 means the shift II to I. In this case, it is of course possible to have the respective meanings of the outputs p and q as well as those of the outputs r and s replaced by one another, in which case the outputs of "0" and "1" are only to be reversed. In all events, the output of "1" or "0" is to be generated depending on the counterclockwise shift or the clockwise shift in the respective quadrants of the vector rotating responsive to the movements of the object to be detected.

Figure 9:
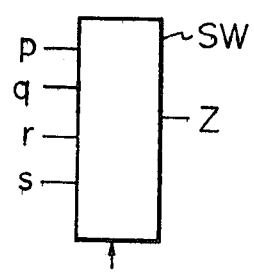
FIG. 9 is a block diagram of an electronic switch used in a quadrant shift direction detecting circuit of the device shown in FIG. 4.

In the above arrangement, such an electronic switch as shown in FIG. 9 may be used in place of the gates $G_1$ to $G_8$ and diodes $D_1$ to $D_8$ in the circuit 27 of FIG. 4. This electronic switch SW is provided with four input terminals to which the outputs p, q, r and s of the flip-flops $FF_1$ and $FF_2$ are respectively applied, and with an output terminal z to which the single input signal appointed by the quadrant signal applied as a control signal is provided. Relations between the quadrant signals and the output signals are as in the following Table 3. In view of this Table 3, it will be evident that, when the quadrant signal I indicating that the vector is in the quadrant I, for example, is provided, the electronic switch SW selects the input s, which provides an output of "1" when the vector comes as shifted from the quadrant IV, or an output of "0" when the vector comes as shifted from the quadrant II, as has been described in the above. In the same manner, when the quadrant signal II is generated, the electronic switch SW selects the input p, which provides an output of "1" when the signal II comes as shifted from the quadrant I, while an output of "0" is provided when the signal II comes as shifted from the quadrant III. For the quadrant signals III and IV, too, an output of "1" at the time of the counterclockwise rotation and an output of "0" at the time of the clockwise rotation will be provided by the inputs r and q, depending on the process before the quadrant signal is generated, that is, the shifting direction of the vector.

TABLE 3

| Quadrant Signal | Output Z |
|---|---|
| I | s |
| II | p |
| III | r |
| IV | q |

When there is no quadrant signal, the shifting direction cannot be defined, so that the electronic switch SW will not select any input signal and, in this case, the input and output are made not to be related to each other.

Figure 8:
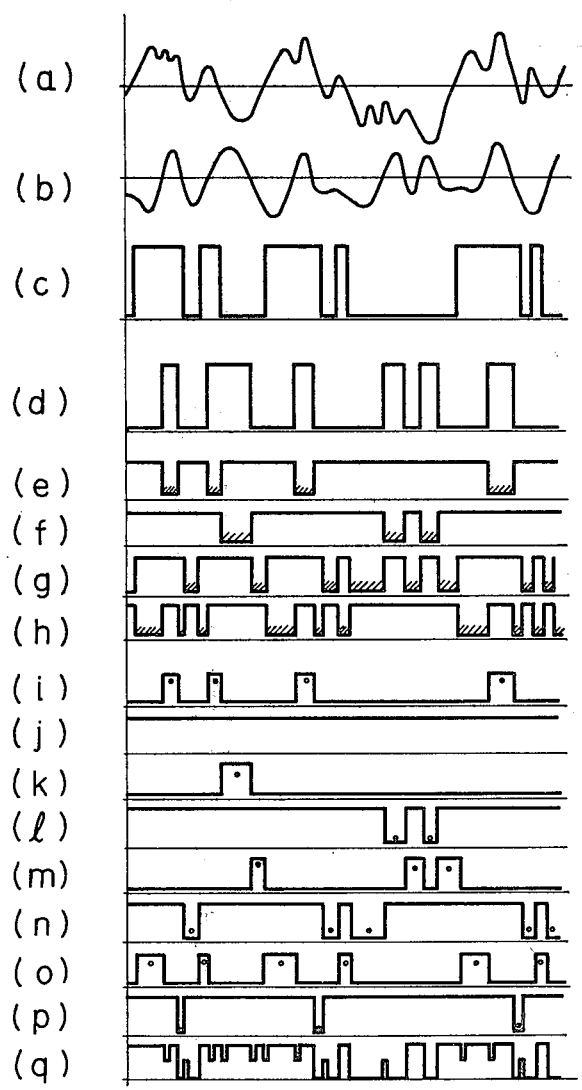
FIG. 8 shows wave forms at the respective parts in the device of FIG. 4 in its operation with respect to a bell ring.

Now, the signal Z obtained by the quadrant shift direction detecting circuit 27 is integrated by the integrating circuit 8, which comprises a resistance $R_{11}$ and capacitor $C_{11}$. By means of bias resistances $Rb_1$ and $Rb_2$ provided at the output end, the output voltage of this circuit 8 at the time of no signal is made $Y_2$ Vcc. Even in case different moving speeds occur simultaneously as in such continuously moving closer or approaching object as particularly a human body, the rate of the time of generating a signal of the positive voltage showing a counterclockwise direction by the operations of such respective parts as are described above will be predominantly larger than the rate of the period of generating a signal of the negative voltage and the output of the integrating circuit 8 will be of the positive voltage. On the contrary, when the object moves away, the output will be of the negative voltage. When it is detected by the threshold level circuit 9 comprising comparators $OP_1$ and $OP_2$ that of the positive or negative voltage (with respect to ½ Vcc.) exceeds a certain the output of the integrating circuit 8 of the positive or negative voltage (with respect of the ½ Vcc) exceeds a certain threshold level, the threshold level circuit 9 will generate an output, by which a transistor Tr of the indicator driving circuit 28 will be driven to operate a relay Ry so as to indicate the presence of the moving object. Here, noises, for example, such random noises as the sounds of a bell ring will cause the vector rotating direction to be random at all, because the time of generating such sounds will be random, all the residual sounds will remain for a fixed time and, therefore, the vector will not continuously rotate. The response to the bell sounds is shown in FIG. 8, in which (a) shows the Doppler signal E, (b) shows the Doppler signal E', (c) shows the binary number X corresponding to the Doppler signal E, (d) shows the binary number Y corresponding to the Doppler signal E', (e) to (h) show respectively the quadrant signals I, II, III and IV, the parts indicated by hatchings show the presence of the signals, (i) to (p) show respectively the outputs of the gates $G_1$ to $G_8$, the parts marked with a small circle show the presence of the signals, and (q) shows the output of the integrating circuit 8. As will be evident from these wave form diagrams, the circuit operation is performed in the same manner as in the case of the moving object, but the positive and negative voltage signals are generated substantially at an equal probability at random and are canceled and inhibited with each other by being integrated for a fixed time.

According to the present invention, as has been described above, the respective quadrants of the vector of the received-wave signals are made known on the basis of a pair of the Doppler signals and the shifts of the quadrants are traced, whereby the direction and period of the rotation of the vector included in the received-wave signal can be continuously obtained. Accordingly, the present invention is effective in that the presence of the moving object can be reliably detected without requiring any frequency analysis to be based on the spectrum characteristics or any electromechanical correlater, any deterioration of the detecting capacity can be extremely reduced even when an interfering phenomenon is present, the circuit formation is simple, and thus the manufacturing cost can be made lower.

While in the foregoing descriptions the division of the vector plane into the four quadrants I through IV has been referred to for the purpose of determining the state of the vector rotation, the number of such division may be at least three or more. In an event when the vector plane is divided, for example, into three, the purpose can be established by mixing the received-wave signal with three reference signals respectively different in the phase by 120° and obtaining a zone signal by means of a signal of a combination of respective vector component signals of theses reference signals.

We claim:

1. A moving object detecting device comprising an oscillator, a radiating-wave transducer, a received-wave transducer receiving reflected waves from a moving object and converting said reflected waves to a received-wave signal, a mixing means for converting said received-wave signal to a pair of vector signals, a pair of binary number converters converting said pair of vector signals to a pair of binary numbers, a quadrant signal generating circuit generating a quadrant signal depending on said pair of binary numbers, a quadrant shift direction detecting circuit generating one of shift direction signals of positive and negative voltages corresponding to a vector shifting direction based on a pair of signals including informations on said quadrant signal, an integrating circuit integrating said shift direction signal, a threshold level circuit detecting output levels of said integrating circuit, and an indicator driving circuit driven by an output of said threshold level circuit, the presence of said moving object being detected by judging shifting direction of respective quadrants through which the vector of the received-wave signals pass.

2. A device according to claim 1, wherein said quadrant shift direction detecting circuit includes a storage means for temporarily storing said quadrant signal, and said pair of signals including the quadrant signal informations are said stored quadrant signal and a next coming quadrant signal.

3. A device according to claim 2, wherein said storage means comprises a pair of flip-flops.

4. A device according to claim 3, wherein said quadrant shift direction detecting circuit further includes a plurality of AND circuits respective to which a combination of said quadrant signal and a signal from said flip-flops is provided as an input.

5. A device according to claim 3, wherein said quadrant shift direction indicating circuit further comprises a switch means having a plurality of input terminals and a single output terminals, said input terminals receiving an output signal from said flip-flops so that said switch means provides at said output terminal a single output signal appointed by said quadrant signal from said quadrant signal generating circuit.

6. A moving object detecting device comprising an oscillator, a radiating-wave transducer, a received-wave transducer receiving reflected waves from a moving object and converting said reflected waves to a received-wave signal, a mixing means for converting said received-wave signal to a pair of vector signals, a pair of binary number converters for converting said pair of vector signals to a pair of binary numbers, a quadrant signal generating circuit generating a quadrant signal depending on said pair of binary numbers, a level detecting circuit detecting any of said pair of vector signals above a predetermined level and providing upon an detection of such vector signal a quadrant signal denoting shifting direction of the vector signal in the vector plane, a quadrant shift direction detecting circuit generating one of shift direction signals of positive and negative voltages corresponding to a vector shifting direction based on a pair of signals including informations on said quadrant signal, an integrating circuit integrating said shift direction signal, a threshold level circuit detecting output levels of said integrating circuit, and an indicator driving circuit driven by an output of said threshold level circuit, the presence of said moving object being detected by judging shifting direction of respective quadrants through which the vector of the received-wave signal pass.

* * * * *